C. L. MERRY.
LENS MOUNT.
APPLICATION FILED JULY 11, 1910.
1,034,391.
Patented July 30, 1912.
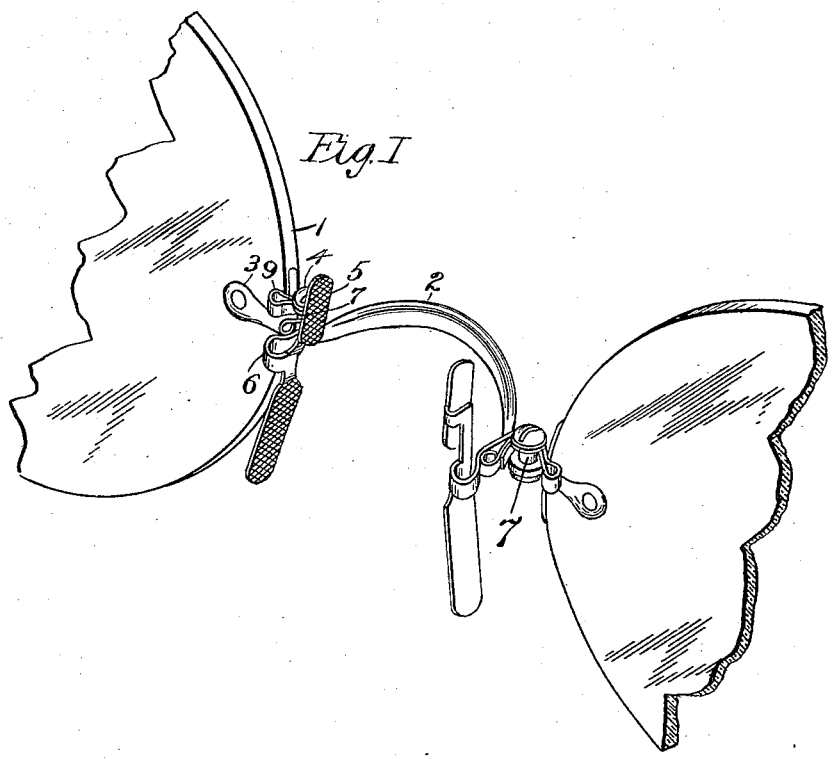
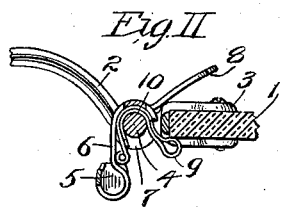
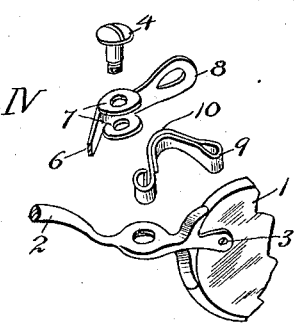
WITNESSES:
INVENTOR.
C. L. Merry,
BY
ATTORNEY.

UNITED STATES PATENT OFFICE.

CHARLES L. MERRY, OF KANSAS CITY, MISSOURI.

LENS-MOUNT.

1,034,391. Specification of Letters Patent. Patented July 30, 1912.

Application filed July 11, 1910. Serial No. 571,326.

*To all whom it may concern:*

Be it known that I, CHARLES L. MERRY, a citizen of the United States, residing at Kansas City, in the county of Jackson and State of Missouri, have invented certain new and useful Improvements in Lens-Mounts; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to improvements in eye glass lens mounts and has particular reference to the spring whereby the nose guard is yieldingly held against the nose of the wearer; the object of the invention being to increase the flexibility of the nose guard without weakening the grip. In accomplishing this object I have provided an improved form of spring which may be easily and quickly applied to the mounting, and comprises an over-lapped portion which acts in the nature of a relay.

The preferred form of my improvement is illustrated in the accompanying drawings, in which:—

Figure I is a perspective view of a part of a pair of eye-glasses having the nose guards equipped with springs constructed according to my invention. Fig. II is a cross section through the nose guard post, showing the spring mounting. Fig. III is an enlarged perspective view of the spring.

Referring more in detail to the drawings:—1 designates the lenses, 2 the bridge, and 3 the lens mounts of an ordinary eye-glass; the bridge 2 being offset, adjacent to the lenses, and provided with a threaded aperture for receiving the post screw 4.

5 designates the nose guard which is provided with a shank 6, and with spaced hub collars 7, having apertures through which the post screw 4 is adapted to project, the shank being provided with an extension 8 which serves as a finger grip for spreading the nose guard.

9 designates the nose guard spring having a central portion 10 adapted to seat between the spaced collars 7 and nest around the post screw when the latter is in position; the ends of the body portion being curved elliptically and adapted to engage respectively the edge of the adjacent lens and the nose guard shank 6. The spring 9 is flat and bent back at the lens end, so that it over-laps the elliptical body portion and projects part way over the inner face of the nose guard shank portion.

The spring may be set in between the hub collars before the screw 4 is inserted, so that the screw will act as a keeper to retain same in position; there being no positive attachment, as the spring may be held firmly in position when the lower end of the screw is threaded into the bridge offset.

In using an eye-glass constructed with my improvements, the spring will tend to force the nose guard against the nose of a wearer, but when the nose guard is pressed back by manipulating the finger grips, it is moved against the tension of the free end of the spring, which is reinforced or relayed by the over-lapped member, so that the first action is less positive than a continued back movement of the nose guard, producing increased flexibility and at the same time providing a firm grip against the nose when the eye-glasses are in use.

Having thus described my invention, what I claim as new therein and desire to secure by Letters-Patent is:—

1. An eye-glass mount comprising a bridge, a lens mount, a pivot pin rising from the bridge, a guard lever pivoted on said pin, and a two leaf spring held between the pivot pin and guard lever, with one end resting against the lens mount and the other resting against the guard lever, one leaf of said spring being shorter than the other and back-lapped thereon.

2. An eye-glass mount comprising a bridge, a lens mount, a pivot pin rising from the bridge, a guard lever pivoted on said pin, and a two leaf spring held between the pivot pin and guard lever, with one end resting against the lens mount and the other resting against the guard lever, one spring leaf being arranged to resist the initial outward pressure of said guard lever, and the other leaf being arranged to reinforce the first leaf and yield only after continued outward pressure of said guard lever.

3. An eye-glass mount comprising a bridge, a lens mount, a pivot pin rising from the bridge, a guard lever pivoted on said pin, and a two leaf spring held between the pivot pin and guard lever, with one end resting against the lens mount and the other resting against the guard lever, the spring leaves being overlapped and of unequal length, the long leaf having its free end engaging the guard lever, and the shorter leaf being arranged to reinforce the longer member and yield only after continued outward pressure of the guard lever.

4. The combination with a bridge and lens mount, of a pivot pin carried by the bridge, a guard lever pivotally mounted on the pivot pin and having a nose piece and finger grip, and a spring comprising a plurality of substantially V-shaped flat members hung on said pivot pin, with one member engaging the nose piece and lens mount, the other spring member being shorter than the first named member, and adapted for reinforcing same, substantially as set forth.

5. The combination with a lens, and a nose guard having a shank portion provided with spaced collars, of a flat spring having a curved body portion located between the collars, and end portions engaging respectively the lens and guard shank, the spring being formed of a single piece of spring metal, that is bent upon itself and shaped, one leaf of the spring being longer than the other and engaged by the nose guard, and a post passing through the shank collars and extended in front of the curved body of the spring, substantially as set forth.

In testimony whereof I affix my signature in presence of two witnesses.

CHARLES L. MERRY.

Witnesses:
ARNOLD F. MEGEDE,
MYRTLE M. JACKSON.

---

Copies of this patent may be obtained for five cents each, by addressing the "Commissioner of Patents, Washington, D. C."